United States Patent Office 3,444,262
Patented May 13, 1969

3,444,262
OLEFIN DISPROPORTIONATION WITH THORIA CONTAINING CATALYSTS
Louis F. Heckelsberg, Bartlesville, Okla., assignor to Phillips Petroleum Company, a corporation of Delaware
No Drawing. Filed Jan. 3, 1966, Ser. No. 517,905
Int. Cl. C07c 3/62
U.S. Cl. 260—683                      3 Claims

ABSTRACT OF THE DISCLOSURE

Olefins are disproportionated by contact with a catalyst comprising thoria promoted by an oxide, sulfide or hexacarbonyl of tungsten or molybdenum.

---

This invention relates to the disproportionation of olefin hydrocarbons. In one aspect, it relates to a process for disproportionating an olefin having 3–20 carbon atoms by contact with a catalyst comprising thoria promoted by a tungsten or molybdenum compound such as oxide, sulfide, or hexacarbonyl.

By disproportionation according to this invention is meant the conversion of a hydrocarbon into similar hydrocarbons of both higher and lower number of carbon atoms. When propylene is disproportionated approximately equimolar quantities of ethylene and butenes are produced.

An object of this invention is a convert an olefin hydrocarbon to similar olefin hydrocarbons of higher and lower numbers of carbon atoms.

Another object of this invention is to produce ethylene and butenes from propylene.

Other aspects, objects and the advantages of my invention are apparent in the written description and the claims.

According to this invention, olefin hydrocarbons having 3 to 20 carbon atoms per molecule are disproportionated by contacting with a catalyst comprising thoria promoted by a compound of tungsten or molybdenum such as an oxide, sulfide, or hexacarbonyl of these metals.

The thoria component of the catalyst can be any suitable catalytic grade material however prepared. The ammoniacal precipitation from a thorium nitrate or a thoruim oxalate solution to form a thoria gel is an example of a suitable technique. The thoria can range, in form, from a fine powder to coarse granules. The finished catalyst, prepared from such thoria, also can be in the form of powder or granules, as well as other shapes, such as agglomerates, pellets, spheres, extrudates, bead, and the like, depending upon the type of contacting technique to be utilized.

Suitable promoters for the thoria include molybdenum oxide, tungsten oxide, molybdenum sulfide, tungsten sulfide, molybdenum hexacarbonyl, tungsten hexacarbonyl, or combinations of these. Although not a promoter in the strict sense, a minor amount of cobalt oxide frequently has been found beneficial when used with one or more of the above-mentioned oxide promoters. The completed catalysts contain from about 0.1 to about 30, preferably from about 1 to about 15, weight percent of one or more of the above-mentioned promoters. Promoter concentrations higher than these can be used if desired but generally there is no advantage to be gained to offset the economic premium paid for excess promoter.

The promoted catalyst compounds can be prepared and activated by any suitable technique. For example, molydenum oxide can be coprecipitated with or impregnated on a thoria gel, followed by calcination in air at temperatures of 700–1600° F. for 0.5 to 20 hours. Tungsten sulfide can be ball milled with thoria, followed by heating in an inert gas such as nitrogen for 0.5 to 20 hours at 800–1400° F. or higher. By using a non-aqueous solvent such as benzene, molybdenum hexacarbonyl can be contacted with a thoria base which has previously been activated by calcination in air. Drying the resulting composition at temperatures which may range up to about 1000° F. in an inert atmosphere completes the preparation. Therefore, the catalyst can be prepared by impregnation, dry mixing, coprecipitation, or other suitable methods. Suitable tungsten or molybdenum compounds include the oxides, sulfides, or hexacarbonyls and compounds convertible to oxides, sulfides, or hexacarbonyls. The catalytic agent is the product produced by the incorporation of the promoter with the thoria base. Complete and definitive analysis of the catalytic product is not practical and it is not intended that the invention should be limited by the specifically named compounds. This is especially true when the carbonyls are employed as promoters since the carbonyls, especially at higher temperatures, are not completely stable.

The catalysts, when prepared and activated as described above, can be employed directly in the process to disproportionate olefins or, alternatively, the catalysts can be given a post-activation treatment, if desired, by contact with a suitable gas at an elevated temperature. Such post activation treatment frequently is capable of improving the activity and selectivity of the catalytic process. The post activation treatment can be carried out in the same way as the original catalyst activation, that is, the contact can be made by passing the gas through a fixed or fluidized bed of the catalyst maintained at a suitable temperature. Gases suitable for this treatment include hydrogen, carbon monoxide, and the lower olefins. Such a treatment can take place in the temperature range of 300–1000° F. and for a length of time which varies according to the temperature of the treatment and according to the specific gas utilized. In general, shorter treatments are used with higher temperatures and vice versa. Similarly, the more reactive gases such as hydrogen and carbon monoxide generally require shorter times than gases such as the lower olefins. The treating gases also can be diluted with an inert gas, such as helium, nitrogen, argon, or the like. The gas mixture, however, should contain at least 10 volume percent of the selected treating gas which, like the activated gas, should be essentially anhydrous.

Suitable feeds for the process of this invention include acyclic olefin hydrocarbons and their aryl derivatives containing from about 3 to about 20 carbon atoms per molecule and mixtures thereof. The process has advantageously been applied to non-symmetrical olefins and mixtures of olefins and the conversion of propylene to ethylene and butenes has been found particularly valuable. The number of different products obtainable can be increased by using mixtures of the olefins.

The disproportionation process can be carried out either batch-wise or continuously, using a fixed catalyst bed, stirred batch reactor, fluidized catalyst chamber, moving catalyst bed, or other suitable contacting technique. Preferably, the process is carried out in a vapor or liquid phase at temperatures from about 300 to about 800° F., more preferably 400 to 600° F., at pressures of 0–2000 p.s.i.g. or higher. In continuous operation, gaseous hourly space velocities (vol. gas/vol. cat./hr.) in the range of 6–5000 are suitable. In batch reactions, the catalyst comprises from about 1 to about 40 weight percent of the reaction mixture and reaction times of about 1 minute to about 20 hours are suitable. If desired, paraffinic and cycloparaffinic hydrocarbons having up to about 12 carbon atoms per molecule can be employed as diluents for the reaction.

At the end of the reaction period, conventional methods are used to separate the hydrocarbon phase from the liquid catalyst phase and to recover the products. Techniques such as fractional distillation, solvent extraction, adsorption, and the like, can be employed for the separation of products. Unconverted feed materials, diluents, or products not in the desired molecular weight range, can be recycled.

The invention is further illustrated by the following examples.

EXAMPLE I

A catalyst containing about 90 weight percent thoria and 10 weight percent tungsten oxide was prepared. 17.42 parts by weight of dry thoria (prepared by the gelation of thorium nitrate with ammonium hydroxide in a water-methanol medium) was impregnated with a solution of 2.25 parts by weight ammonium metatungstate in about 50 parts by weight water. The solution was added incrementally to the thoria with stirring and with drying between additions.

A bed of about 2.5 parts by weight of a 20–40 mesh fraction of the above impregnated catalyst was charged in a glass reactor, preceded by a bed of glass beads. Using an electrical heater which surrounded the glass reactor, the catalyst bed was activated in place by heating for four hours at 1000° F. in a stream of flowing air. Following the activation, the system was flushed with nitrogen and cooled.

Propylene was introduced into the reactor at atmospheric pressure and at a space rate of 600 vol. gas/vol. cat./hr. at 400° F. The results of the test, in terms of the analysis by weight of the reactor effluent obtained by vapor phase chromatography, are given in the following table:

| | Percent |
|---|---|
| $N_2$, $O_2$, $H_2$ [1] | 0.1 |
| Ethylene | 0.3 |
| Propylene | 97.2 |
| Butanes | 0.6 |
| 1-butene | 0.5 |
| Trans-2-butene | 0.5 |
| Cis-2-butene | 0.3 |
| $C_5^+$ | 0.5 |

[1] Contains some unavoidable air from the analytical sampling system.

The data in the above table show that the conversion of propylene was 2.8 percent with an efficiency of 57 percent to disproportionated products.

EXAMPLE II

A thoria-tungsten oxide catalyst was prepared which contained 3 weight percent tungsten oxide, based on the weight of the composite, in a manner essentially identical to that of Example I except that the dry material was pilled using pressure and the pills were broken up. A 20–40 mesh fraction of the agglomerates was then charged into the reactor and activated by heating for four hours at 1000° F. in a stream of flowing air.

After the activation treatment, the catalyst bed was cooled to about 200° °F. and propylene was passed through it while the temperature of the bed was slowly raised to 1000° F. The temperature increase took about 1 hour and the treatment was continued at 1000° F. for still another hour. The temperature of the bed again was lowered to 600° F. and then to 400° F. Propylene, at the rate of 600 vol. gas./vol. cat./hr. and at atmospheric pressure was passed therethrough at both 600° F. and 400° F. and disproportionated and sampled. The table below illustrates the results in terms of effluent analysis (weight percent) sampled at 400° F. and at 600° F.

| Reaction temperature, ° F | 400 | 600 |
|---|---|---|
| $N_2$, $O_2$, $H_2$ [1] | t | 0.2 |
| Ethylene | 0.2 | 1.0 |
| Propylene | 99.1 | 96.9 |
| 1-butene | t | 0.4 |
| Trans-2-butene | 0.4 | 0.9 |
| Cis-2-butene | 0.3 | 00.6 |
| Propylene conversion, percent | 0.9 | 3.1 |

[1] Includes some air.

These data show that propylene is disproportionated to both ethylene and butenes and that the run at 600° F. shows an efficiency greater than 90 percent. Since propylene was used as the post activation treatment gas, some disproportionated products were observed throughout the treatment but the activity of the system was greatest following the treatment.

Reasonable variation and modification are possible within the scope of this invention which sets forth a process for disproportionating olefins.

I claim:
1. A process which comprises disproportionating at least one olefin hydrocarbon having from 3 to 20 carbon atoms per molecule to form olefins having greater and lesser numbers of carbon atoms per molecule by contacting said olefin with a catalyst consisting essentially of thoria and a promoter selected from oxides, sulfides or hexacarbonyls of tungsten or molybdenum under conditions including conditions of temperautre, pressure and contact time suitable for obtaining a disproportionated product, said temperature being in the range of 300–800° F.

2. The process of claim 1 wherein said olefin is disproportionated at a temperature in the range of 400–600° F. and at a pressure of 0–2000 p.s.i.g.

3. The process of claim 2 wherein said promoter is tungsten oxide.

References Cited

UNITED STATES PATENTS 2,614,137  10/1952  Chenicek _____ 260—683
2,785,209   3/1957  Schmetterling et al. __ 260—668
3,261,879   7/1966  Banks _____ 260—683

DELBERT E. GANTZ, Primary Examiner.

C. E. SPRESSER, Assistant Examiner.